United States Patent
Sivaswamy et al.

(10) Patent No.: US 11,875,100 B1
(45) Date of Patent: Jan. 16, 2024

(54) DISTRIBUTED PARALLEL PROCESSING ROUTING

(71) Applicant: XILINX, INC., San Jose, CA (US)

(72) Inventors: Satish Sivaswamy, Fremont, CA (US); Ashot Shakhkyan, Yerevan (AM); Nitin Deshmukh, Monroe, WA (US); Garik Mkrtchyan, Fremont, CA (US); Guenter Stenz, Niwot, CO (US); Bhasker Pinninti, San Jose, CA (US)

(73) Assignee: XILINX, INC., San Jose, CA (US)

( * ) Notice: Subject to any disclaimer, the term of this patent is extended or adjusted under 35 U.S.C. 154(b) by 274 days.

(21) Appl. No.: 17/339,232

(22) Filed: Jun. 4, 2021

(51) Int. Cl.
  *G06F 30/3947* (2020.01)
  *G06F 9/355* (2018.01)
  *G06F 9/50* (2006.01)
  *G06F 30/347* (2020.01)

(52) U.S. Cl.
  CPC ........ *G06F 30/3947* (2020.01); *G06F 9/3555* (2013.01); *G06F 9/5061* (2013.01); *G06F 30/347* (2020.01)

(58) Field of Classification Search
  CPC ... G06F 30/3947; G06F 30/347; G06F 9/3555
  USPC ......................................................... 716/126
  See application file for complete search history.

(56) References Cited

U.S. PATENT DOCUMENTS

| | | | |
|---|---|---|---|
| 10,783,295 B1 | 9/2020 | Dong et al. | |
| 10,891,413 B1 | 1/2021 | Kundarewich et al. | |
| 11,003,827 B1 * | 5/2021 | Kundarewich | G06F 30/347 |
| 2003/0229876 A1 * | 12/2003 | Mehrotra | G06F 30/394 |
| | | | 716/129 |
| 2008/0222289 A1 * | 9/2008 | Conway | H04L 47/829 |
| | | | 709/225 |
| 2010/0169858 A1 * | 7/2010 | Betz | G06F 30/394 |
| | | | 716/131 |
| 2015/0135147 A1 * | 5/2015 | Emirian | G06F 30/347 |
| | | | 716/105 |
| 2023/0205968 A1 * | 6/2023 | Kahng | G06F 30/3953 |
| | | | 716/129 |

\* cited by examiner

*Primary Examiner* — Suchin Parihar
(74) *Attorney, Agent, or Firm* — Patterson + Sheridan, LLP

(57) ABSTRACT

Examples described herein provide a non-transitory computer-readable medium storing instructions, which when executed on one or more processors, cause the one or more processors to perform operations. The operations include generating a plurality of child processes according to a number of a plurality of partitions in an integrated circuit (IC) design for an IC die, each of the plurality of child processes corresponding to and assigned to a respective one of the plurality of partitions. The operations include transmitting each of the plurality of partitions to a respective one of the plurality of child processes for routing, each of the plurality of partitions comprising a placement of components for the IC design. The operations include receiving a plurality of routings from the plurality of child processes. The operations include merging the plurality of routings into a global routing for the IC design by assembling together to form a global routing.

20 Claims, 14 Drawing Sheets

| SEGMENT | BUDGET |
|---|---|
| DRIVER→L1 | $Budget(L_1)$ |
| DRIVER→NET CROSSING d4 | $\dfrac{d_2 * Min(Budget(L_2, L_3))}{d_2 + d_4 + Max(d_5, d_6 + d_7 + d_8)}$ |
| NET CROSSING d5→L2 | $\dfrac{d_5 * Budget(L_2)}{d_2 + d_4 + d_5}$ |
| NET CROSSING d4→NET CROSSING d7 | $\dfrac{d_6 * Budget(L_3)}{d_2 + d_4 + d_6 + d_7 + d_8}$ |
| NET CROSSING d7→L3 | $\dfrac{d_8 * Budget(L_3)}{d_2 + d_4 + d_6 + d_7 + d_8}$ |

DISTRIBUTED PARALLEL PROCESSING ROUTING

TECHNICAL FIELD

Examples of the present disclosure generally relate to integrated circuit design and, in particular, to parallel processing for integrated circuit design.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

Routing on ICs typically takes the longest time out of all the steps involved hi physical design. The long time required for routing on ICs is primarily due to the process of resolving routing conflicts on resources that are used up by multiple nets. While routing conflicts are a generic problem for routing tools, programmable IC routers have additional complexity in that all the wires/interconnection points are pre-fabricated and the flexibility offered to the router is quite limited. Pre-fabricated wires/interconnection points and limited flexibility also makes the routing process a largely sequential process especially when most of the global congestion is largely resolved. However, the challenge is to extract parallelism out of the routing process to alleviate some of the long runtime concerns.

Generally, routing tools parallelize implementation by dividing the chip area into different regions and routing nets that are fully contained in them in parallel. For nets that cross between different regions, routing tools either tend to route these nets sequentially or in parallel with outdated resource usage in order to preserve repeatable results. However, both routing sequentially or in parallel require frequent synchronization to make sure the quality of results are unaffected, and frequent synchronization brings down the scalability of sequential or parallel routing because multiple threads need to wait for each other when synchronizing. To summarize, routing implementations suffer the following disadvantages: (1) synchronization overhead to update outdated congestion data on resources, (2) convergence issues since routing tools use outdated congestion to extract parallelism, (3) reduced thread-scaling if the nets are routed only in non-overlapping regions in parallel, (4) higher peak-memory usage, especially when routing search space is large since all threads will explore the search space concurrently.

SUMMARY

Examples of the present disclosure generally relate to routing algorithms for configuring devices to reduce synchronization overhead and address other parallel routing disadvantages.

One example of the present disclosure is a non-transitory computer-readable medium storing instructions, which when executed on one or more processors, cause the one or more processors to perform operations. The operations include generating a plurality of child processes according to a number of a plurality of partitions in an integrated circuit (IC) design for an IC die, each of the plurality of child processes corresponding to and assigned to a respective one of the plurality of partitions. The operations include transmitting each of the plurality of partitions to a respective one of the plurality of child processes for routing, where each of the plurality of partitions comprises a placement of components for the IC design. The operations include receiving a plurality of routings from the plurality of child processes. The operations include merging the plurality of routings into a global routing for the IC design by assembling together to form a global routing.

Another example of the present disclosure is a non-transitory computer-readable medium storing instructions, which when executed on one or more processors, cause the one or more processors to perform operations. The operations include receiving, from a parent process, a partition for routing, where the partition is one of a plurality of partitions of an integrated circuit (IC) design for an IC die. The operations include receiving clock routing information and routing constraints from the parent process. The operations include performing routing of a net to a plurality of loads on the partition. The operations include transmitting the results of the initial routing to the parent process.

Examples of the present disclosure also provide apparatus, methods, processing systems, and computer readable mediums for performing the operations described above.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
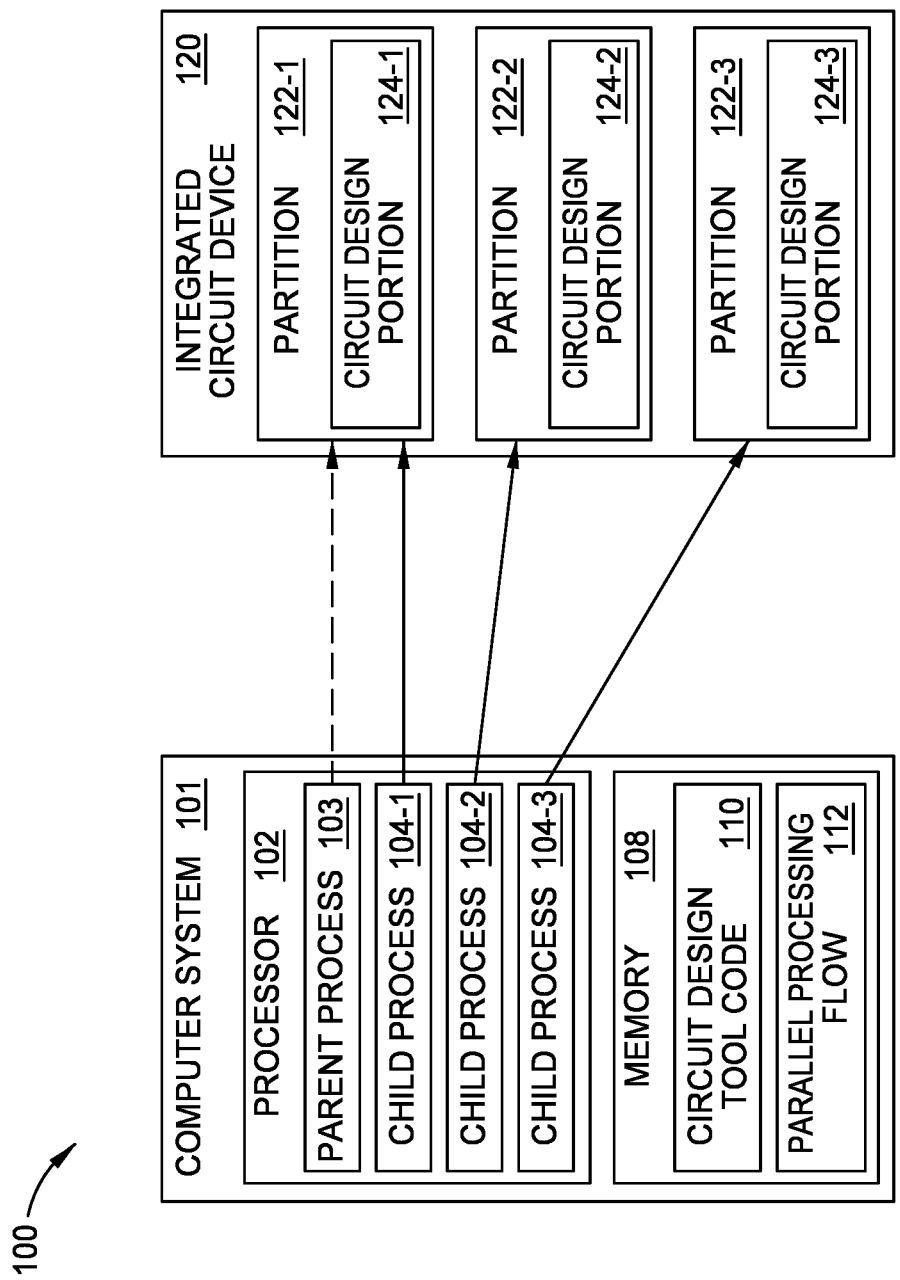
FIG. 1A depicts an example of a circuit design system using a parallel processing flow, according to some examples.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe parallel processing flow for routing components on an integrated circuit (IC) design and configuring IC dies according to the routing of the IC design. The parallel processing flow involves generating multiple child processes to handle routing nets of partitions of a single IC die. In some examples, the partitions correspond to programmable logic regions of the IC die, and the IC design includes these partitions of the IC. The parallel processing flow can partition the IC design of the single IC die into multiple partitions for the child processes to perform routing. Each child process handles routing a net through a partition of the IC die, and once each child process is finished routing the net through its respective partition, the child processes send the routing results to a parent process. The parent process merges the routing results into a global routing that can be used for configuring the IC die.

Examples herein also describe scheduling cores to different design partitions to minimize compute resource usage both in terms of the availability of CPUs and the power usage. Examples herein reduce the peak memory usage and facilitate faster implementation of large IC designs compared to current techniques.

In some examples, an IC design may be configured for stacked silicon interconnect technology (SSIT) devices or devices with multiple IC dies. In such devices, different programmable logic regions of an IC device are connected to each other using specialized interposers. These specialized interposers connect different programmable regions together at predefined connection locations, and the IC device includes a limited number of these connection locations for the specialized interposers. These specialized interposers also form a natural place where IC designs can be partitioned.

Some placement and routing operations already employ partitioning to make sure the IC design does not oversubscribe the available interposer capacity. As far as routing is concerned, examples described herein address interposer routing and then routing in each programmable logic region in parallel with no synchronization between the programmable logic regions until the end of the routing operation. Accordingly, multiple routing processes can route nets of the programmable logic regions in parallel in the same machine with no synchronization overhead or on different machines on a cluster with much lower peak memory.

Some advantages because of the multiple routing processes include: (1) minimal to no synchronization overheads once routing problem is scoped to programmable logic regions; (2) no outdated data that needs synchronization across programmable logic regions once the interposers are fixed; (3) an inherently parallel system which performs the interposer routing first, decouples the routing of the programmable logic regions, and thus improves thread scaling using the divide-and-conquer paradigm; and (4) reduction of peak memory demand on each machine of a cluster performing routing of the programmable logic region. These advantages provide the ability to run large IC designs on machines with smaller memory.

According to some examples, the parallel processing routing described herein provides for a couple of flavors of distributed algorithms (interchangeably called parallel processing flow, PPF). The parallel processing routing described herein provides one example where the parent processes and the child processes are deployed on the same machine (e.g., processor) and another example where the parent processes and the child processes are distributed on different machines on a cluster. According to examples described, the IC device is partitioned into multiple partitions, each with a circuit design portion, and the circuit design portion of each partition is routed in parallel by a different process. The processes run either all on a single machine or are distributed onto machines on a cluster. Each process in turn, has a group of threads that route the circuit design portion of the partition assigned to the process.

FIG. 1A is a block diagram depicting an example of a circuit design system 100 using multi-processing routing. The circuit design system 100 includes a computer system 101 coupled to an IC device 120 with partitions 122-1, 122-2, 122-3. The computer system 101 includes a processor 102 and a memory 108. The processor 102 executes a parent process 103 and child processes 104-1, 104-2, 104-3 (collectively "child processes 104"). The number of child processes 104 can correspond to the number of partitions of the IC device 120. Because each of the child process can perform the same operations, reference to a single child process can apply to any other child processes 104.

The partitions 122-1, 122-2, 122-3 (collectively "partitions 122") can be programmable logic regions of the IC device 120. The IC device 120 can be an active IC, which is an IC that includes active circuitry (e.g., transistors), as opposed to a passive IC, such as an interposer, that includes only conductive interconnect. The IC device 120 can be a mask-programmed IC, such as an application specific integrated circuit (ASIC), or an IC, such as an FPGA. The IC device 120 can include all mask-programmed ICs, all programmable ICs, or a combination of both mask-programmed ICs and programmable ICs. While the IC device 120 is shown as having three partitions, in general the IC device 120 can include two or more partitions. The terms "partition" and "programmable logic regions" are used herein interchangeably.

A user interacts with the circuit design system 100 to generate a circuit design, which is then implemented for the IC device 120. The circuit design system 100 implements different circuit design portions 124-1, 124-2, 124-3 of the circuit design (collectively circuit design portions 124) in different partitions 122 in a manner that optimizes routing of components of the IC design for the IC device 120. In the example, the circuit design portion 124-1 is implemented using resources of the partition 122-1, the circuit design portion 124-2 is implemented using resources of the partition 122-2, and the circuit design portion 124-3 is implemented using resources of the partition 122-3. As discussed below, the circuit design system 100 implements circuit design portions 124 of the circuit design using multiple child processes 104, each corresponding to a respective partition of an IC device. In the example, each child process 104 routes a net in a corresponding circuit design portion.

In some examples, each child process 104 is assigned to a partition 122 of the IC device 120. The parent process 103 generates the child processes 104 that can run on the processor 102. The number of generated child processes 104 can equal the number of partitions of the IC device 120. In some examples, the parent process 103 can configure each child process 104 to perform routing for a corresponding partition of the IC device 120. The parent process 103 can also perform routing for a partition of the IC device 120. In some examples, the parent process 103 can assign a partition to each child process 104 (or to itself if it is configured to perform routing for a partition of the IC device 120).

In some examples, the computer system 101 can be coupled to input/output (IO) devices (not illustrated) and a display (not illustrated) to allow a user to interact with computer system 101. In some examples, the computer can include various support circuits (not illustrated) and an IO interfaces (not illustrated) to support the computer system 101 and to allow interaction between the computer and a user. The support circuits can include conventional cache, power supplies, clock circuits, data registers, IO interfaces, and the like. The IO interface can be directly coupled to the memory 108 or coupled through the processor 102. The IO interface can be coupled to the IO devices, which can include conventional keyboard, mouse, and the like. The IO interface can also be coupled to the display, which can present a GUI to a user.

The memory 108 may store all or portions of one or more programs and/or data to implement aspects of the circuit design system 100 described herein. The memory 108 can store circuit design tool code 110 that is executable by the processor 102. In some examples, the memory 108 can store code for parallel processing flow 112, which is described below. The memory 108 can include one or more of random access memory (RAM), read only memory (ROM), magnetic read/write memory, FLASH memory, solid state memory, or the like as well as combinations thereof.

In some examples the circuit design tool 110 can be configured to receive behavioral description of a circuit design for the IC device. The circuit design tool 110 processes the behavioral description to produce a logical description of the circuit design. The logical description includes a logical network list ("netlist") of lower-level circuit elements and logic gates, as well as connections (nets) between elements of the netlist, in terms of the hierarchy specified in the behavioral description. For example, the logical description may be compliant with the Electronic Design Interchange Format (EDIF). The circuit design tool 110 may also generate constraint data associated with the logical description that includes various timing and layout constraints. Alternatively, the logical description may be annotated with constraint data. Such an annotated netlist is produced by XST synthesis tool, commercially available by Xilinx, Inc., of San Jose, California.

In some examples, the circuit design tool 110 can pass the logical description of the circuit design to the parallel processing flow 112. Because the parallel processing flow 112 is configured to implement the circuit design on the IC device 120, the parallel processing flow 112 can include a map tool and a place-and-route (PAR) tool. The map tool maps the logical description onto physical resources within the IC device 120 (i.e., the circuit components, logic gates, and signals are mapped onto LUTs, flip-flops, clock buffers, I/O pads, and the like of the target FPGA). The map tool produces a mapped circuit description in accordance with any constraints in the constraint data. The mapped circuit description includes groupings of the physical resources of the IC device 120 expressed in terms of CLBs and IOBs that include these resources. In one embodiment, the mapped circuit description does not include physical location information. The PAR tool is configured to receive the mapped circuit description and the constraint data. The PAR tool determines placement for the physical resource groupings of the mapped circuit description in the IC device 120 and apportions the appropriate routing resources. The PAR tool performs such placement and routing in accordance with any constraints in the constraint data. The PAR tool produces physical design data.

In some examples, the parallel processing flow 112 can also include a bitstream generator. In some examples, the bitstream generator is configured to receive the physical design data and produce bitstream data for the IC device 120.

Figure 1B:
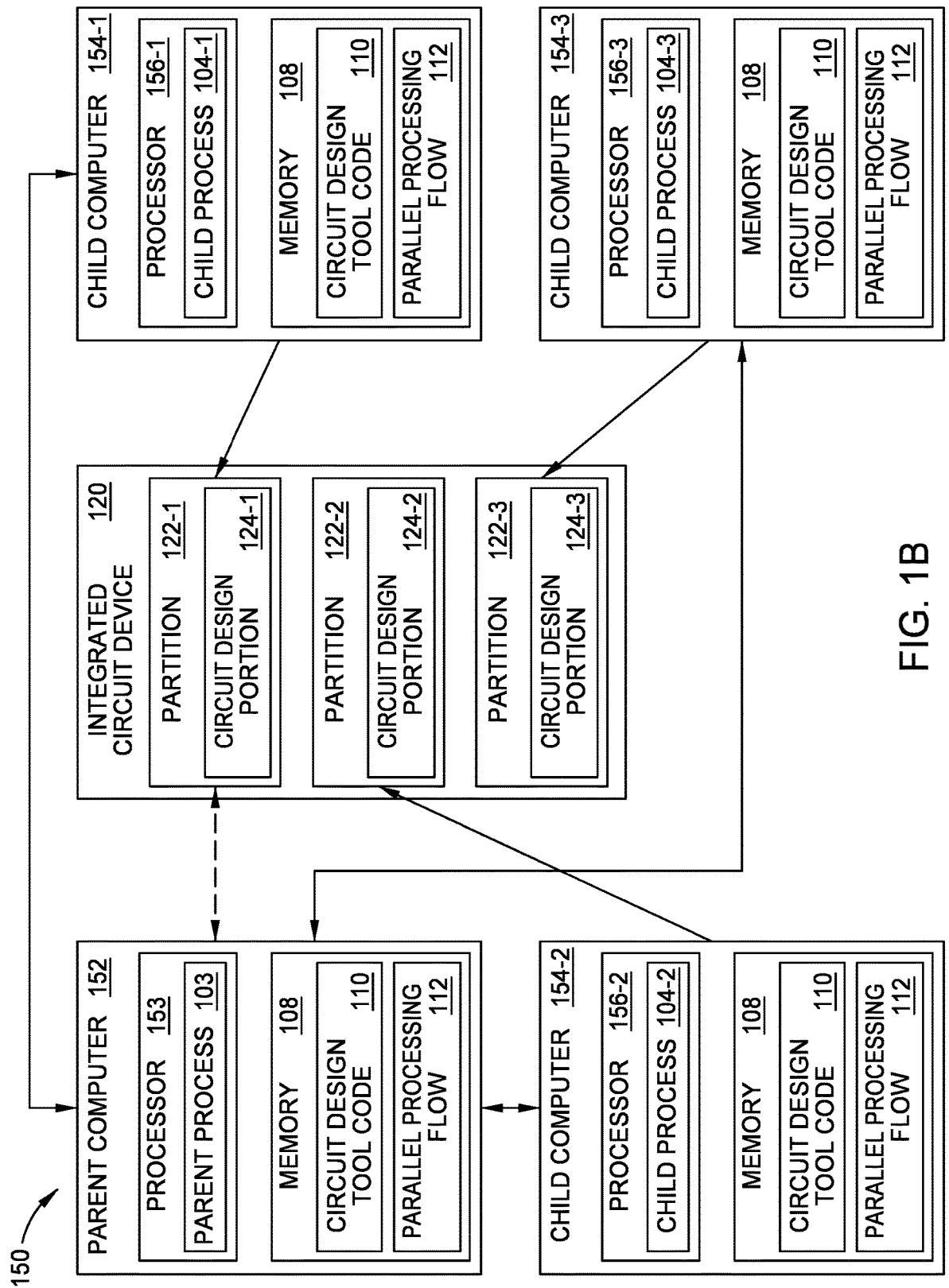
FIG. 1B depicts another example of a circuit design system using a parallel processing flow, according to some examples.

FIG. 1B illustrates an example of another circuit design system 150 using multi-processing flow. The circuit design system 150 includes multiple computers: parent computer 152 and child computers 154-1, 154-2, and 154-3 (collectively child computers 154), and each computer has at least one processor. Processor 153 executes a parent process 103 on the parent computer 152 while the other three processors 156-1, 156-2, and 156-3 (collectively processors 156) execute child processes 104 on the child computers 154. With each computer having at least one processor, multiple computers are coupled to the IC device 120. For example, each of the child computers 154 is coupled to a partition of the IC device 120.

Each of the parent computer 152 and child computers 154 has memory 108 storing circuit design tool code 110 and code for parallel processing flow 112. The parent computer 152 can be configured with the parent process 103 similar to the parent processor 102 shown in FIG. 1A. For example, the processor 153 of the parent computer 152 is configured to perform operations of the parent process 103 similar to the processor 102 of the computer system 101 of FIG. 1A. Accordingly, the parent process 103 uses the processor 153 of the computer 152 to generate child processes 104 for the processors 156 of the child computers 154, and instruct them to perform routing operations for an IC die of the IC device 120. Similarly, the processors 156 of the child computers 154 are configured to perform operations of the child processes 104 similar to the processor 102 of the computer system 101 of FIG. 1A. Accordingly, the processors 156 of the child computers 154 are configured to receive child processes 104 from the processor 153 of the parent computer 152, and to perform routing operations for partitions of the IC device 120. For ease of reference, the parent computer 152 can perform any operations attributed to the processor 102 of FIG. 1A, and the child computers 154 can perform any operations attributed to the processor 102 of FIG. 1A.

Because the processors 156 of the child computers 154 are disposed on different machines than the processor 153 for the parent computer 152, the parent computer 152 comprises components (not illustrated) that facilitate communication with the child computers 154. Similarly, the child computers 154 comprises components (not illustrated) that facilitate communication with the parent computer 152. Generally, FIGS. 1A and 1B represent two different computing systems that can be used to perform MPF. The child processes 104 are executed on different processors (or different cores in the same processor) which can be in the same computing system (as shown in FIG. 1A) or different computing systems (as shown in FIG. 1B). However, FIGS. 1A and 1B are non-limiting examples since multi-processing routing can be performed in any manner which permits the parent and child processes to execute in parallel.

Figure 2:
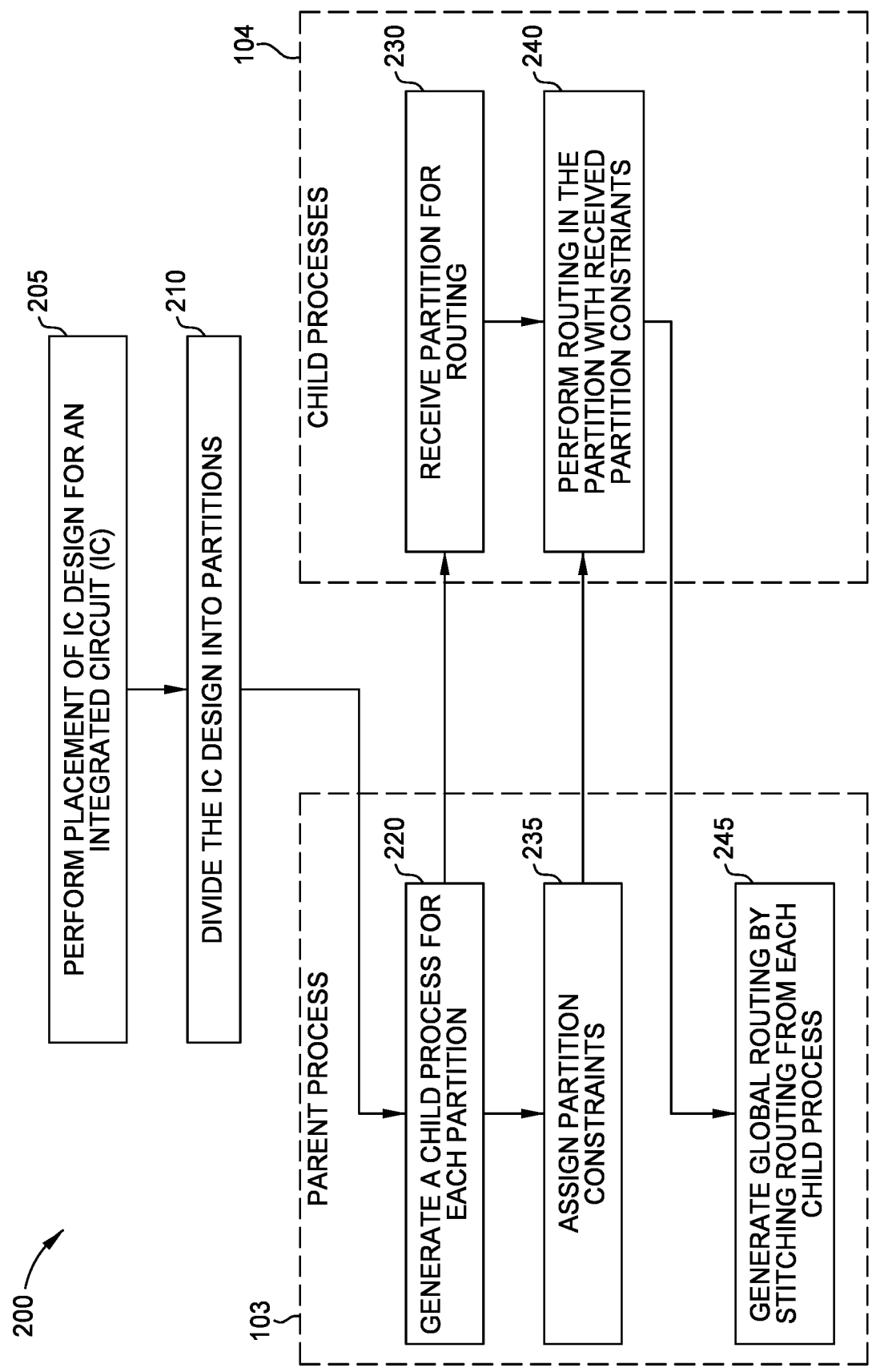
FIG. 2 is a flowchart of operations for routing for an integrated circuit (IC), according to some examples.

FIG. 2 is a flowchart of operations 200 for configuring an IC device (e.g., IC device 120 of FIGS. 1A and 1B) using multi-processing flow (e.g., using circuit design systems 100 or 150 of FIGS. 1A and 1B), according to one example. When configuring an IC device, a configuration tool performs placement and routing of components of the IC device. Operations 200 for configuring an IC device begins, at block 205, with a processor performing placement of components of the IC device for a circuit design. In some examples, the processor performs placement of components of the IC device also using the multi-processing flow.

Once placement is complete, at block 210, the processor divides the IC design into partitions. These partitions may be based on programmable logic regions on the IC, and/or on interposers that separate and/or divide the IC into regions. In some examples, the partitions may each be an IC die of the IC device. Blocks 205 and 210 can be performed by computing resources in the circuit design systems 100 or 150, or could be performed by a different computing system which then sends the design to the circuit design system 100 or 150.

At block 220, the parent process 103 generates a child process for each partition. In some examples, the parent process also includes operations for performing the placement (at block 205) and the partition division (at block 210). Each child process 104 generated by the parent process 103 corresponds to a respective partition of the IC device 120. For example, a first child process corresponds to partition 122-1 of the IC device 120, a second child process corresponds to partition 122-2 of the IC device 120, and so forth. In some examples, the child processes 104 can correspond to a processor 102 of FIG. 1A. The parent process 103 can also perform the operations of a child process 104, accordingly the parent process 103 is assigned a partition of the IC device 120 as illustrated in FIGS. 1A and 1B. For example, the parent processor 102 is assigned and corresponds to partition 122-1 and so can operate on partition 122-1. In such examples, the parent process 103 generates fewer child processes 104 to accommodate the parent process 103 operating as a child process. In some examples, the parent process 103 can generate any number of child processes 104 depending on how many circuit design portions the user wants to use for routing of the circuit design.

In some examples, the parent process 103 transmits a partition to each of the generated child processes 104, the partition corresponding to and assigned to a child process 104. For example, the parent process 103 transmits the circuit design portion 124-1 to the child process 104-1, and the child process 104-1 performs routing operations for the circuit design portion 124-1 to partition 122-1. Similarly, the parent process 103 transmits the circuit design portion 124-2 to the child process 104-2 and the circuit design portion 124-3 to the child process 104-3. In some examples, the parent process 103 can act as a child process and keeps a circuit design portion (e.g., the circuit design portion 124-1) for routing operations. In other examples, the parent process 103 may generate the child processes 104 with the respective partitions and corresponding information for routing.

At block 230, the parent process 103 determines and assigns partition constraints of the IC design. These partition constraints can include timing constraints, budgeting constraints, and other various constraints from a user, which can be specific to partitions. The parent process 103 then sends the partition constraints to the child processes 104. In some examples, the parent process 103 sends all partition constraints to each child process 104. In other examples, the parent process 103 sends partition constraints specific to the child process 104 for each child process 104 generated by the parent process 103.

Once the child processes 104 have received their respective assigned partitions and partition constraints, at block 240, each of the child processes 104 performs routing for the respective partition. The routing can include using a Boolean satisfiability problem (SAT) algorithm, an integer linear programming (ILP) algorithm, a PathFinder algorithm, a greedy algorithm, and/or the like.

As the child processes 104 complete routing on their respective partitions, the child processes 104 send the completed routing to the parent process 103, and at block 245, the parent process 103 generates a global routing by stitching routings received from the child processes 104.

As mentioned, the multi-processing routing described herein allows for two examples: the multiprocessing routing is used on a single processor, or the multi-processing routing is used on multiple processors. While the two examples differ slightly in the management of processes and communication methodology, the example multi-processing produces similar results with similar quality. In some examples, multiple routing processes (e.g., the child processes) can run on multiple processors. For example, a first processor performs operations for the parent process, a second processor performs operations for two child processes, and a third processor performs operations for another two child processes.

Figure 3:
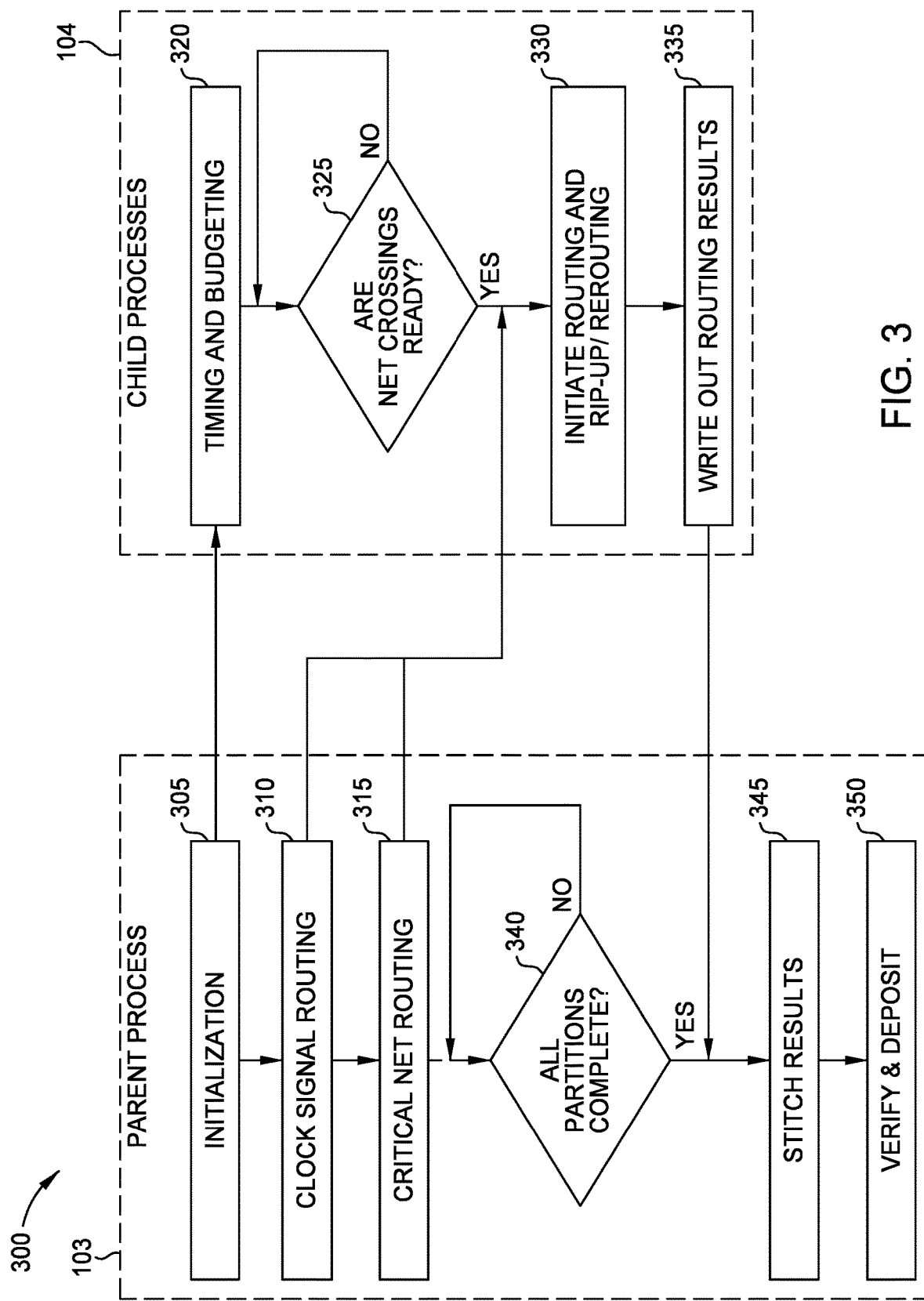
FIG. 3 is a flowchart illustrating example single-machine parallel processing flow, according to some examples.

FIG. 3 is a flowchart of operations by a routing tool for routing components of an IC design. Specifically, FIG. 3 illustrates example operations 300 for single-machine single processing flow (e.g., using circuit design system 100 of FIG. 1A).

The parent process 103 starts routing operations, at block 305, by initializing any tools or data needed for routing the components of the IC device (e.g., IC device 120 of FIG. 1A).

After initialization 305, the parent process 103 generates multiple child processes 104 for routing, one child process 104 for each partition 122. These child processes 104 operate in parallel with each other, and in some examples, the child processes 104 share the same memory (e.g., memory 108 of FIG. 1B). In some examples, the parent process 103 transmits the circuit design portions 124 of partitions 122 to the child processes 104 for routing, and in other examples, the parent process 103 generates each child process 104 with its respective partition 122 and its corresponding circuit design portion 124.

After generating the child processes 104, the parent process 103 performs clock signal routing at block 310 and critical net routing at block 315, which determines critical net locations (i.e., locations where the net of the IC device 120 crosses between partitions 122). Clock signal routing 310 includes the parent process 103 routing the clock signal to the partitions 122 without causing significant amount of delay, so that each partition can receive the same clock signal at the same time. Critical net routing 315 includes the parent process 103 identifying locations in each partition where the net crosses into another partition 122, thus creating a critical net location.

Meanwhile, each of the child processes 104, at block 320, performs operations for timing and budgeting for routing nets on its respective partition 122.

Once each child process 104 determines its own timing constraints and budget constraints, at block 325, the child processes 104 wait until the parent process 103 has completed clock routing 310 and critical net routing 315 and transmitted the information therefor to the child processes 104.

Once the child processes 104 receive the clock routing 310 and the critical net routing 315 from the parent process 103, each of the child processes 104 performs operations 330 for initial routing and any rip-up and/or rerouting for each programmable logic region asynchronously.

At block 335, the child processes 104 write out the routing results of their respective circuit design portions 124 and send the routing results of their respective circuit design portions 124 for their respective partitions 122 back to the parent process 103.

Meanwhile, at block 340, the parent process 103 monitors the progress of the child processes 104 to determine if the routings for the respective partitions 122 of the child processes are complete.

When the child processes 104 complete the routings for all the partitions 122, at block 345, the parent process 103 merges the routings together into a global routing. Afterwards, at block 350, the parent process 103 performs post-processing on the global routing, including verifying the global routing, and deposits the global routing into a centralized database.

According to some examples, the parent process 103 uses forks when generating and initializing the child processes 104. As illustrated in FIG. 3, the parent process 103 starts and runs through the initialization 305 at the end of which the parent process 103 generates the child processes 104 via a fork for routing a net for the circuit design portion 124 of each partition 122. By using the fork, the child processes 104 do not need to also run initialization operations. With the fork, the parent process 103 creates a shared memory mapping for the child processes 104, and can immediately use data structures with no overhead. Also, by using the fork, the parent process 103 employs a copy-on-write paradigm: for read-only data, copies are not made for the child processes 104. In the copy-on-write paradigm, individual copies are made only when the child processes 104 write to the data. In some examples, the parent process 103 manages the shared memory (e.g., memory 108 of FIG. 1A) and the internals of the shared memory, thus minimizing memory overhead as much as possible. Minimizing the memory overhead is significant because during initialization, the parent process 103 generates data that is largely read-only.

As illustrated in FIG. 1A, the parent process 103 and the child processes 104 split some computation for the routing operations. For example, the parent process 103 does clock signal routing 310 and critical net routing 315 and at the same time, the child processes 104 run timing and budgeting operations 320. In some examples, the parent process 103 and the child processes 104 communicate with each other through an underlying file system. The underlying file system can facilitate shared memory (e.g., memory 108 of FIG. 1A) between the parent process 103 and the child processes 104 and between the child processes 104 themselves.

Once all the child processes 104 are finished with routing nets of their respective circuit design portions 124 of their respective partitions 122, the parent process 103 merges the routing results from each of the child processes 104 by stitching the routing results. Details of stitching the routing results for the partitions are described below.

Figure 4:
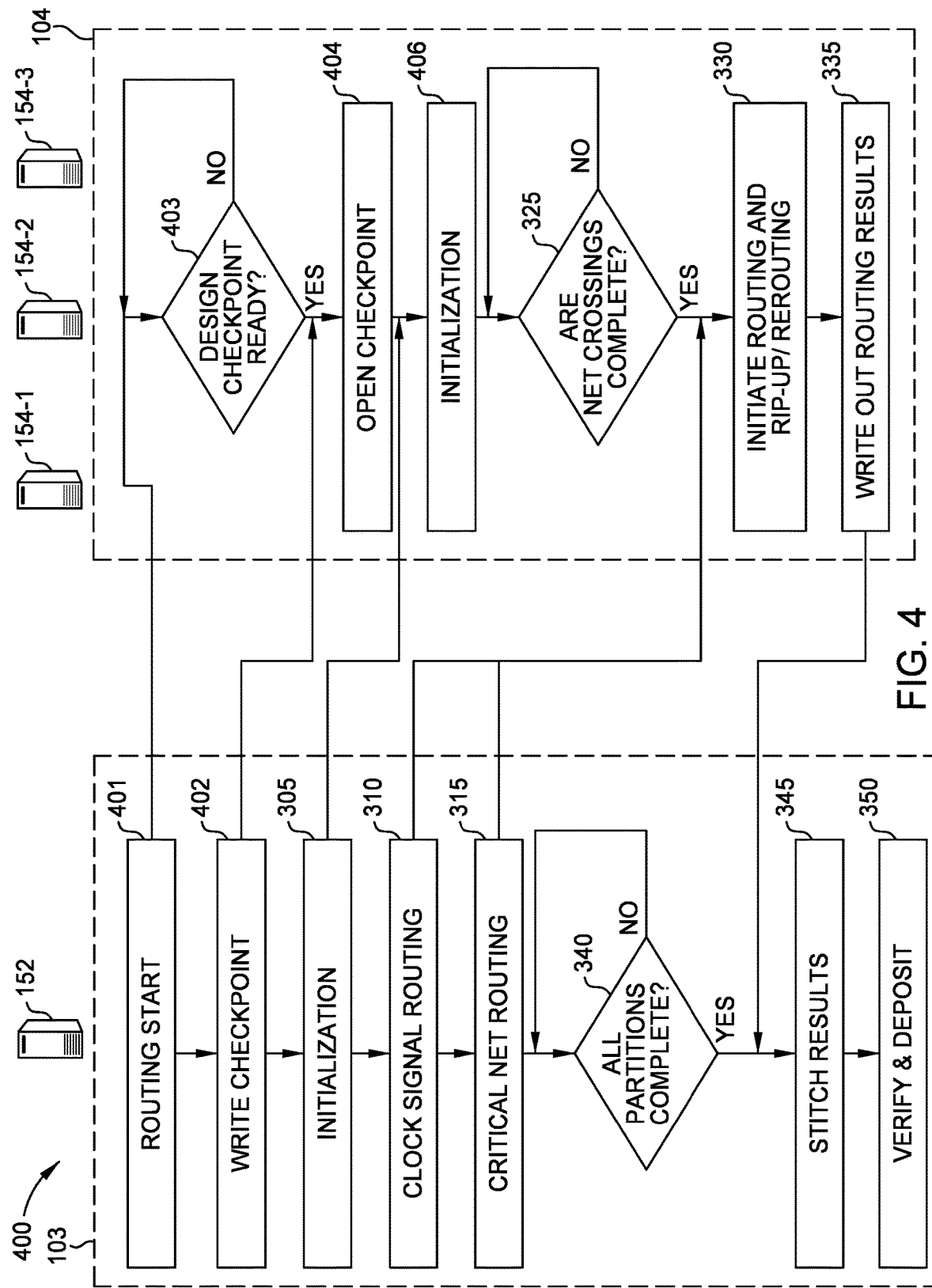
FIG. 4 is a flowchart illustrating example multi-machine parallel processing flow, according to some examples.

FIG. 4 is a flowchart for operations in a multi-processing flow on multiple machines, according to one example. The flowchart 400 illustrates how routing operations are modified for multi-machine multi-processing flow (e.g., using circuit design system 150 of FIG. 1B, as compared to the single machine multiple processing flow illustrated in FIG. 1A). While many operations by the parent process 103 and the child processes 104 are the same in the single machine multi-processing flow (e.g., the single machine multi-processing flow of FIG. 3 using the circuit design system 100 of FIG. 1A) as in the multi-machine multi-processing flow, the multi-machine multi-processing flow includes additional operations to accommodate and facilitate the use of multiple machines (e.g., processors).

As illustrated in FIG. 4, operations 400 begin routing at block 401 with the parent process 103, executing on a parent computer 152. Once the parent process 103 starts (at block 401), the parent process 103 generates the child processes 104 to execute on the child computers 154. In some examples, the parent process 103 sends instructions to the child computers 154 to generate and start executing the child processes 104. As mentioned, the number of child processes 104 generated by the parent process 103 depends on the number of partitions 122 of the IC device 120, and correspondingly, the number of child computers 154 depends on the number of child processes 104. The child computers 154 can be located on a cluster.

At block 402, the parent process 103 writes out a design checkpoint, while the child processes 104 executing on the child computers 154 start by loading up data regarding the IC device and data regarding the respective partitions 122 that the child processes 104 are assigned to route.

In some examples, the parent process 103 writes out the checkpoint in parallel to its initialization 305 because the initialization 305 is largely read-only. In some examples, the design checkpoint is written to the underlying file system that connects the parent computer 152 and the child computers 154. Meanwhile, the child processes 104 monitor whether the design checkpoint is ready (at block 403).

Once the design checkpoint is available on the file system to any of the child computers 154, the child processes 104 executing on the child computers 154 start reading the design checkpoint (at block 404) and complete the rest of their respective initializations 406 that depend on the respective partitions of the IC device 120 that the child processes 104 are intended to route. In some examples, the parent process 103 writes out a design checkpoint after every major stage in the IC design flow (e.g., post logic-optimization, post-placement, post-physical synthesis and post-routing). If the latest state of the IC design flow prior to routing is already available as a design checkpoint in the file system, then the parent process 103 can bypass writing out the design checkpoint and the child processes 104 can directly start reading the design checkpoint because the design checkpoint is already available. Accordingly, already available design checkpoints cut down the waiting time in the child processes 104.

After child processes 104 are done with initialization 406, at block 325, the child processes 104 wait for the critical net locations and clock routing results from the parent process 103. The parent process 103 continues with its execution by running the clock routing 310 and the critical net routing 315, which determines critical net locations. Once done, the parent process 103 writes out results to the file system to be picked up by the child processes 104 running on different child computers 154. In some examples, to further reduce the waiting time in the child processes 104, the parent process 103 can write out results of the clock routing 310 and the critical net routing 315 (i.e., critical net locations) to the file system. As mentioned, details on the communication between the parent process 103 and the child processes 104 are discussed below.

After the child processes 104 receive the clock routing results and the critical net locations from the critical net routing 315, at block 330, the child processes 104 perform an initial routing and perform any needed rip-up and/or rerouting for their respective partitions. The routing can include using a Boolean satisfiability problem (SAT) algorithm, an integer linear programming (ILP) algorithm, a PathFinder algorithm, a greedy algorithm, and/or the like. Once the child processes 104 finish routing their respective partitions, the child processes 104 write out the routing results to the underlying file system.

As mentioned, operation by the child processes 104 in the multi-machine multi-processing example resembles the operation by the child processes 104 in the single machine multi-processing example (e.g., initial routing and rip-up/rerouting 330 of FIG. 4 resembles initial routing and rip-up/rerouting 330 of FIG. 3). However, in some examples, operation by the child processes 104 in the multi-machine multi-processing example differs from the operation by the child processes 104 in the single machine multi-processing example in a few aspects. First, because each machine/processor executes one child process 104 for routing one partition of the IC design in the multi-machine multi-processing flow, the memory capacity of each machine (e.g., child computer 154) is markedly lower than what is required for the single machine multi-processing example in which all the child processes and routing for all partitions executed on the same machine/processor. Second, in the multi-machine multi-processing example, the parent process 103 and child processes 104 overlap computation and communication. For example, the parent process 103 and the child processes 104 write out internal data and perform computation when possible while waiting for data from each other. By overlapping computation and communication, the multi-machine multi-processing flow achieves good performance improvement with minimal waiting overhead.

Figure 5A:
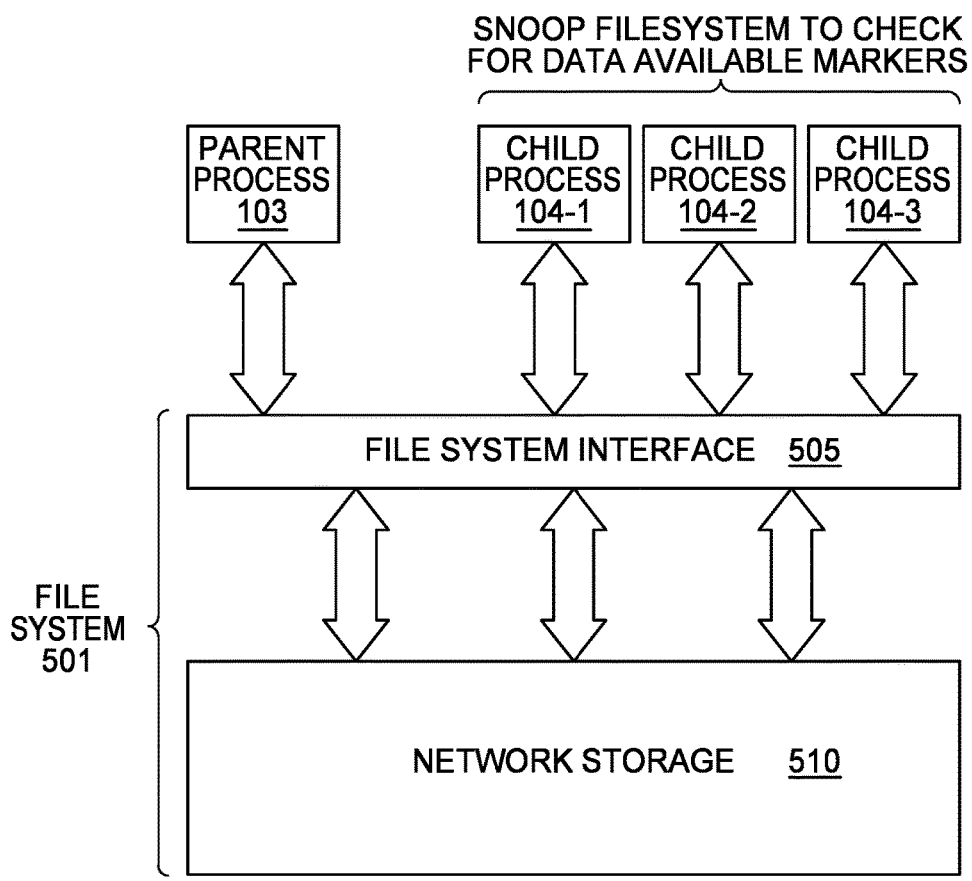
FIGS. 5A and 5B illustrates communication between different processes of a parallel processing flow, according to some examples.
Figure 5B:
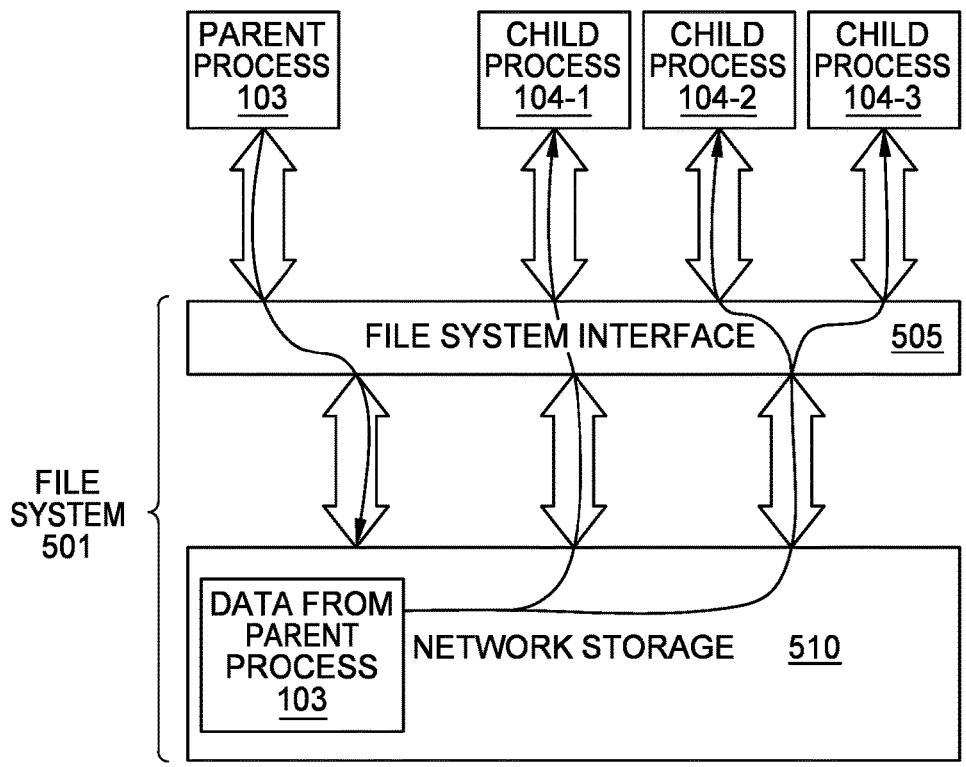

FIGS. 5A and 5B are diagrams illustrating the file system for communication between the parent process 103 and the child processes 104 in both the single-machine and the multi-machine multi-processing flows. As mentioned, the parent process 103 and the child processes 104 rely on communication through the file system 501 to implement the hand-shaking between the parent process 103 and child processes 104. According to one example, as illustrated in FIGS. 5A and 5B, the nodes in the above pictures represent different machines on the cluster. While FIGS. 5A and 5B illustrate operations and features for the multi-machine multi-processing example, the operations and features discussed herein apply to the single-machine multi-processing example.

According to some examples, the communication between the parent process 103 and the child processes 104 requires the parent process 103 and the child processes 104 to have access to a common network mounted storage area 510 of a file system 501. The parent process 103 and child processes 104 snoop the file system 501 (via the file system interface 505) for specific file markers about availability of data, as illustrated in FIG. 5B in which the parent process 103 writes the critical net constraints and/or clock routes. When the parent process 103 is done with the relevant computation (e.g., generating critical net constraints, clock routes), the parent process 103 writes out the information in a compressed format to the file system 501 and adds a file marker indicating that results are available. In the meantime, the child processes 104 and their respective nodes (e.g., the computers 154 which executes the child processes 104) scan the file system 501 for the availability of the file marker added by the parent process 103. Once the child processes 104 detect the file marker, the child processes 104 proceed with parallel loading of the data into their respective memory for further processing.

In some examples, other methods and techniques of communication including specific point-to-point communication or broadcast communications can be used between the parent process 103 and the child processes 104. In such examples, communication between and computation by the parent process 103 and the child processes 104 is organized for good performance to extract the maximum amount of parallelism.

Figure 6:
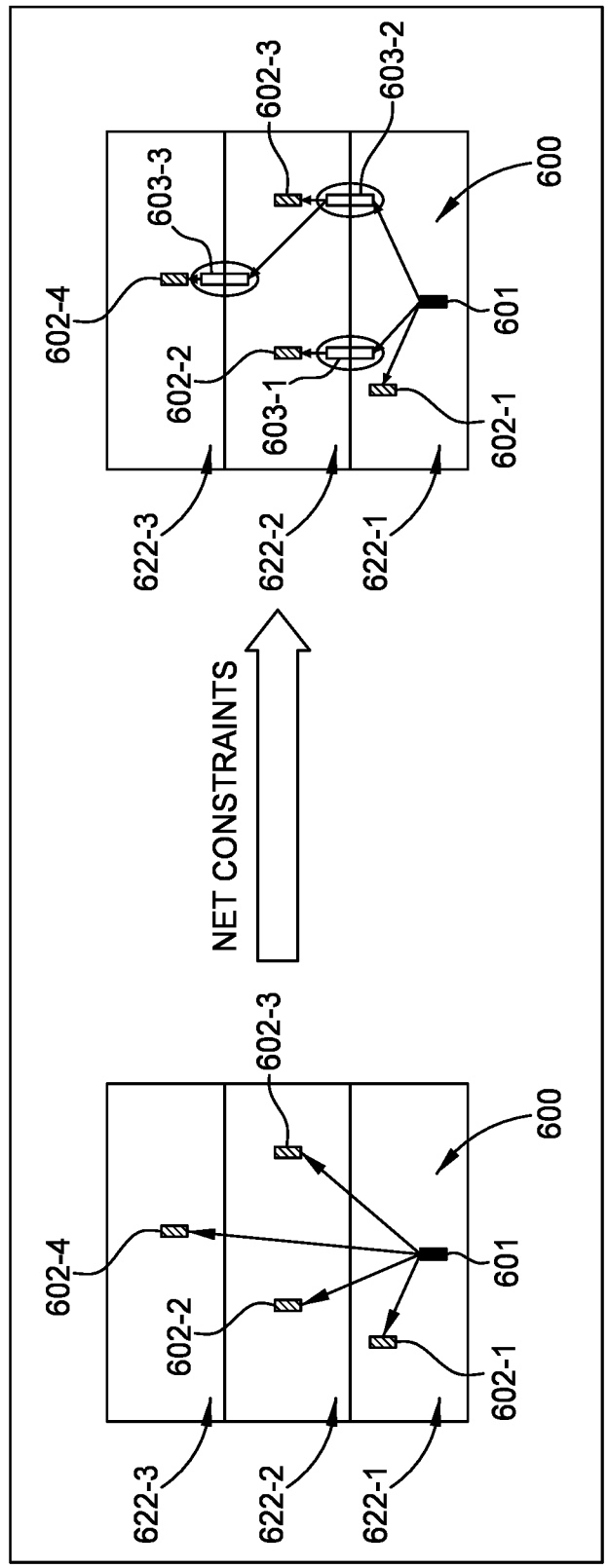
FIG. 6 illustrates an example net of an IC device and example critical net crossings, according to some examples.

According to some examples, as mentioned, the parent process 103 determines that some nets do not cross between partitions 122 and that some nets do cross from one partition 122 to another partition 122. FIG. 6 illustrates an example of routing a net 600 in an IC design with multiple partitions 122. The example IC design of FIG. 6 includes three partitions 622-1, 622-2, and 622-3, and each of the partitions 622-1, 622-2, and 622-3 includes loads 602-1, 602-2, 602-3, and 602-4 (collectively loads 602) connected by a net, which passes through all three partitions 622-1, 622-2, and 622-3. The driver 601 of the net 600 is located in partition 622-1.

According to one example, the parent process 103 performs critical net routing and determines critical net constraints for the net 600. Critical net constraints include critical net crossings 603-1, 603-2, and 603-3 (collectively critical net crossings 603), which are locations on the IC design in which the net 600 crosses from one partition to another partition. In some examples, determining the critical net constraints is a part of the parent process 103 performing critical net routing 315. The parent process 103 may use any method, technique, implementation for critical net routing and determining the critical net crossings, and having the parent process 103 determining the critical net constraints and performing the critical net routing enables the individual partitions to be routed in parallel.

Figure 7:
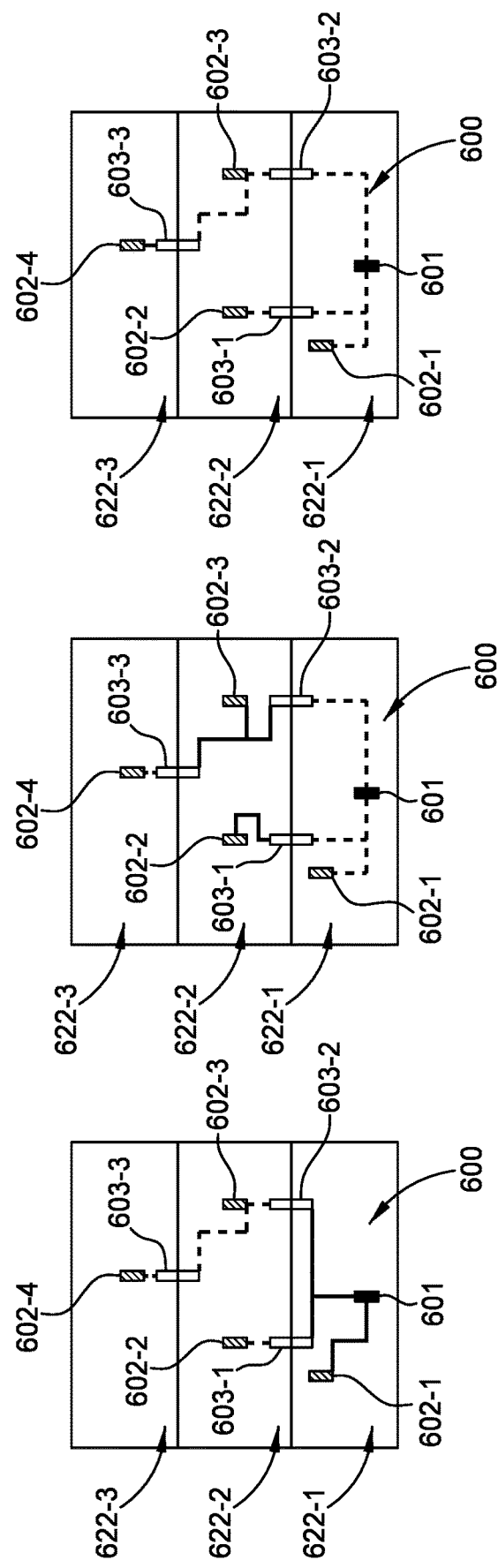
FIGS. 7A, 7B, and 7C illustrates example routing for a partition, according to some examples.

Once the parent process 103 completes critical net routing and the parent process 103 has made the critical net crossings 603 available to the child processes 104, the child processes 104 proceed with routing their respective partition in parallel. FIGS. 7A, 7B, and 7C illustrate routing for a portion of the net 600 for a partition by a child process 104. Specifically, FIG. 7A illustrates routing for partition 622-1 of FIG. 6, FIG. 7B illustrates routing for partition 622-2 of FIG. 6, and FIG. 7C illustrates routing for partition 622-3 of FIG. 6.

As illustrated in FIGS. 7A-7C, a child process 104 routes the net 600 (as a solid line) in its respective partition (illustrated as a sold line). FIGS. 7A-7C also show routing for the net 600 in other partitions (as dotted lines); however, the child processes 104 do not route the net in any other partitions other than the partition to which the child process 104 is assigned.

In some examples, the child process 104 can route the net 600 in other partitions, but the parent process 103 considers the routing results of the net 600 in the partition to which the child process 104 is assigned. In these examples, the child processes 104 route the net 600 in all partitions to prevent partitioning the logical net into multiple individual nets. Partitioning the logical net of the IC design into multiple individual nets corresponding to the multiple partitions involves making expensive netlist edits, which can be costly in terms of processing time of the netlist edits. Routing the net in all child processes 104 does not add a significant overhead because each child process 104 routing the net 600 of a respective partition ignores all routing conflicts in other partitions. For example, the child process 104 routing the partition 622-1 resolves conflicts only on the resources in the partition 622-1. In addition, if the child process 104 assigned to the partition 622-1 uses some resources in the middle and top partitions to route the critical net crossings, the child process 104 will ignore the routing conflicts and will not spend any additional run time trying to legalize them.

Figure 8:
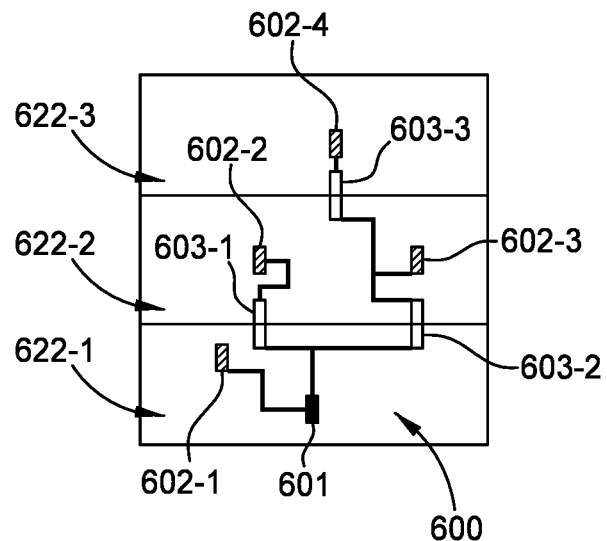
FIG. 8 illustrates example stitching of routing results for multiple partitions, according to some examples.

FIG. 8 illustrates the parent process 103 merging the routing results for the net 600 after the child processes 104 complete routing the net 600 in their respective partitions. As illustrated in FIG. 8, the parent process 103 takes the routing of the net 600 by each child process 104: (1) for the partition 622-1, the parent process 103 takes the routing results of partition 622-1 in FIG. 7A; (2) for the partition 622-2, the parent process 103 takes the routing results of partition 622-2 in FIG. 7B; and (3) for the partition 622-3, the parent process 103 takes the routing results of partition 622-3 in FIG. 7C. With the routing results from each partition, the parent process 103 stitches the routing results of the net 600 for the partitions to form the global routing result for the IC design of the IC device 120.

In order to maintain quality of results in the multi-processing flows (both single machine and multi-machine), the multi-processing flows can include additional features in which results may not be synchronized between the parent process 103 and the child processes 104 until routing in each partition is completed. The quality of results may be impacted by splitting a net to be routed in parallel with no synchronization between the parent process 103 and the child processes 104. An impact of quality of results (QoR) also impacts setup and hold times Accordingly, some examples of the multi-processing flow involves partition-level budget and/or delay splitting. Setup time can be optimized for critical nets crossing between partitions (e.g., partitions 122). Generally, because each partition is routed independently, the child processes 104 are not aware of routings in other partitions. Accordingly, the child process 104 cannot account for the routing delays incurred by other child processes 104 for other partitions. When each child processes 104 completes routing the net for their respective partition with their respective timing update and budgeting, the parent process 103 includes the timing budgets for every load of every net in the IC design. If the delays of the load pins are within their respective timing budgets, then the overall QoR of the design matches a targeted budget for the IC design. The parent process 103 and/or the child processes 104 can use any method or technique for determining the budgets for the partitions.

According to some examples, when the parent process 103 splits the routing of the net 600 into partitions and assigns each partition to a child process 104, the parent process 103 can also split the associated budgets of the load pins of the IC design within the scope of partitions. In some examples, the parent process 103 ensures that if every segment of the net meets its respective budget, then the parent process 103 can maintain the overall timing of pins of the net.

Figure 9:
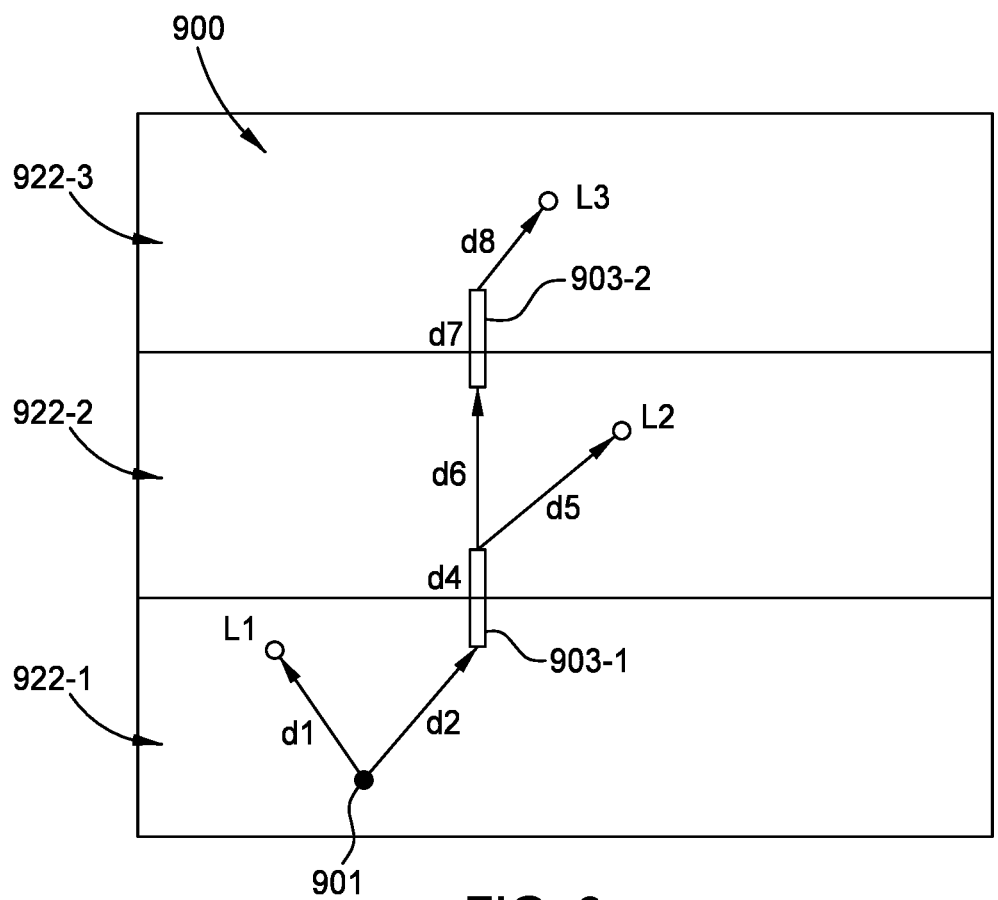
FIG. 9 illustrates an example net with loads, according to some examples.

FIG. 9 illustrates an example routing of a net 900 with loads L1, L2, and L3 in partitions 922-1, 922-2, and 922-3 respectively. As illustrated, the driver 901 of the IC design is in partition 922-1, and the routing includes net crossings 903-1 and 903-2 (collectively net crossings 903), where the parent process 103 determined via critical net routing. The net 900 includes segments that connect the driver 901 to loads L1, L2, and L3 and the loads L1, L2, and L3 to net crossings 903. In some examples, the net 900 can also include segments that connects loads to other loads.

As illustrated in FIG. 9, the net 900 includes the following segments: (1) a segment d1 from driver 901 to loads in the same partition 922-1 (e.g., L1); (2) a segment d2 from driver 901 to net crossing d4 from partition 922-1 to partition 922-2 (3) a segment d5 from net crossings to loads in partition 922-2 (e.g., L2); (4) a segment d6 from net crossing d4 to net crossing d7 from partition 922-2 to partition 922-3; (5) a segment d8 from net crossing d7 to loads in the partition 922-3 (e.g., L3). In some examples, an IC design can include any number of nets, and each net of the IC design can include any number of loads. In such examples, the IC design includes a limited number of net crossings between partitions, and the parent process 103 performs critical net routing that determines the locations of the net crossings between partitions. Accordingly, the net 900 can pass through any number of the net crossings between the partitions of the IC design.

In some examples, the net crossings each have a delay. To address the delay, the critical net crossings can be electrically buffered and can isolate circuitry on either partitions. Accordingly, the parent process 103 can split delay computation into various segments without loss in accuracy. Without strong electric isolation, guard bands may also be used for the net crossings in order to split computation without loss in accuracy.

According to some examples, the parent process 103 examines the budgets defined for the load in the partitions, and the parent process 103 breaks the budgets down into constituent segments. The parent process 103 allocates budgets proportional to the delay of the constituent segment. Delay of the constituent segments depends on placement of the endpoints of the segments or on routing congesting (e.g., because of detours around the routing congestion). Higher budgets can be beneficial for compile time and overall quality because budgets cannot be borrowed from other segments of the net once the child processes 104 start routing the net through the partitions in parallel.

In some examples, the parent process 103 determines the budget for a segment in a partition using the following formula:

$$\text{Segment Budget} = \frac{(\text{Segment Delay}) * (\text{Budget of Most Constrained Downhill Pin})}{\text{Delay of Longest Path Through Segment}}$$

Figures 10, 11:
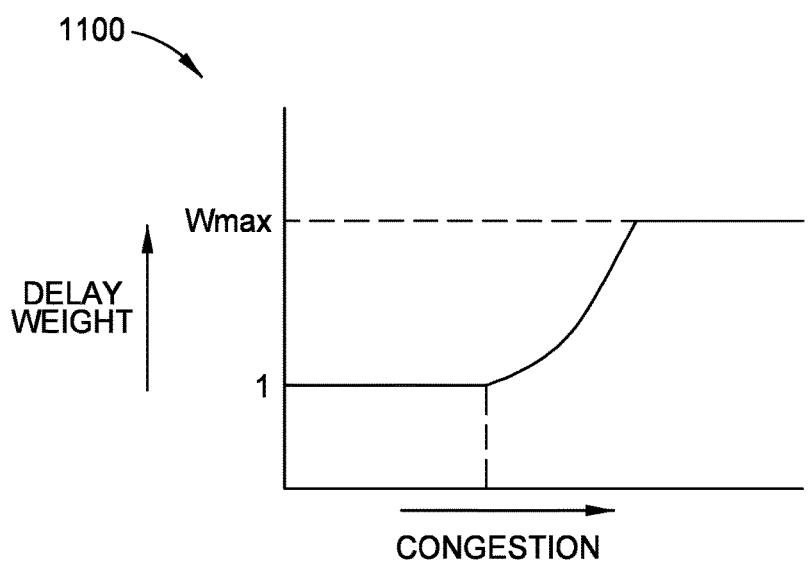
FIG. 10 is a table of segment-wise budget allocation, according to some examples.
FIG. 11 is a graph of an example delay weight function, according to some examples.

FIG. 10 is a table of the calculated budgets for the segments of the net 900 of FIG. 9. The calculated budgets for the segments of the net 900 of FIG. 9 are calculated from the above equation.

In some examples, the parent process 103 when determining budgets performs two traversals of the net: one from driver to loads (i.e., a forward traversal), and another from loads to the driver (i.e., a backward traversal). The parent process 103 uses the two traversals to compute the values used in the above equation. In some examples, the parent process 103 computes Budget of Most Constrained Downhill Pin" and "Delay of Longest Path Through the segment. The computation of Budget of Most Constrained Downhill Pin and Delay of Longest Path Through the segment can be based on the observation that the delay of longest path through segment can be written as follows:

Delay of Longest Path Through Segment=Delay of Longest Path to Segment+Delay of Longest Path from Segment The Delay of Longest Path to Segment can be computed with a forward traversal from the driver and the Delay of Longest Path from Segment is computed with a backward traversal from the loads. While doing the backward traversal, the parent process 103 can also propagate the budgets of the most constrained downhill pin, which is the pin with the minimum budget.

When the parent process 103 reaches a merge point in the traversal (either the forward traversal or the backward traversal), the parent process 103 takes the maximum of the delays and minimum of the budgets and traverses further uphill/downhill. The merge points are points (e.g., loads, net crossings, and driver) in which two segments merge, such as net crossing 903-1 that merges the segments d5 and d6 during a backward traversal in FIG. 9.

According to some examples, the parent process 103 can split up the budgets of a net into constituent segments of the net so that the parent process 103 can treat the different partitions as independent, even for the nets that cross partitions from a timing perspective.

FIG. 11 is a graph 1100 illustrating delay weight needed during budgeting in order to address routing congestion, according to some examples. In some examples, the parent process 103 uses delay weights for the delays of the segments during budgeting. Delay weights can act as multipliers for the segment delays. The use of delay weights is based on the observation that partitions vary in terms of complexity for routing. For example, if one partition is more congested than another, the child process 104 may need to detour more in that partition when routing the net in the partition. Accordingly, a higher budget for the partition would be beneficial.

As illustrated in the graph of FIG. 11, to get a higher budget, the parent process 103 can increase delay of a segment by having a weight greater than 1 as a multiplier of the delay of the segment.

In some situations, some partitions do not experience the actual routing delay of various segments of the net in other partitions as the child processes 104 perform routing in the various partitions. The parent process 103 may assign budgets in a way that meeting budgets would not degrade QoR. This means that when the child processes 104 are routing a partition, the child processes 104 can safely assume that the delays of all segments in other partitions meet the assigned budgets of their respective partition. The assumption by the child processes 104 allows child processes 104 to strictly meet budgets within the assigned partition being routed. If each child process 104 makes this assumption for every partition being routed and if every child process 104 meets their assigned budgets for their respective partition, then the child processes 104 can guarantee that even though the child processes 104 route those partitions completely independently, the child processes 104 will not degrade QoR. If child processes 104 routes nets in all partitions, they can modify the delay calculation engine to replace the delays of segments in different partitions with their respective assigned budgets.

As detailed, splitting budgets, using delay weights based on complexity of routing in partitions, and updating delays in partitions by replacing delays with budgets on other partitions collectively help with reducing QoR loss and also with improving runtime because the child process 104 do not require synchronization of routing between the various partitions.

According to some examples, the child processes 104 can fix hold time violations on net crossings between partitions. Fixing hold time violations on partitions crossing paths are challenging because the child process 104 routing a net segment in a partition is unaware of the routing of other segments of the same net in different partitions.

In some examples, if all segments of a net in a partition other than the partition being routed are assumed to take shortest possible paths, then the child processes 104 can fix all hold violations only on the segments in the partition being routed while ignoring the actual routing in all other partitions. Fixing hold violations in a single partition in isolation helps decouple the partitions and ensure hold violations get fixed.

In some scenarios, the child processes 104 can over-constrain hold by assuming shortest paths in all other partitions. However, a path violates hold only because it is extremely fast and as such should have enough setup margin. The setup margin ensures that the over-constraining that the child process 104 would need to do to guarantee hold time does not adversely impact setup. Further, the amount of over-constraining by a child process 104 is not arbitrary and has a fundamental lower-bound guarantee based on the shortest path delays.

In some examples, the child process 104 can modify the net delay calculation engine to use the shortest path delays for hold when looking at net segments of partitions crossing nets in partitions that are not being routed by the respective child process.

Figure 12:
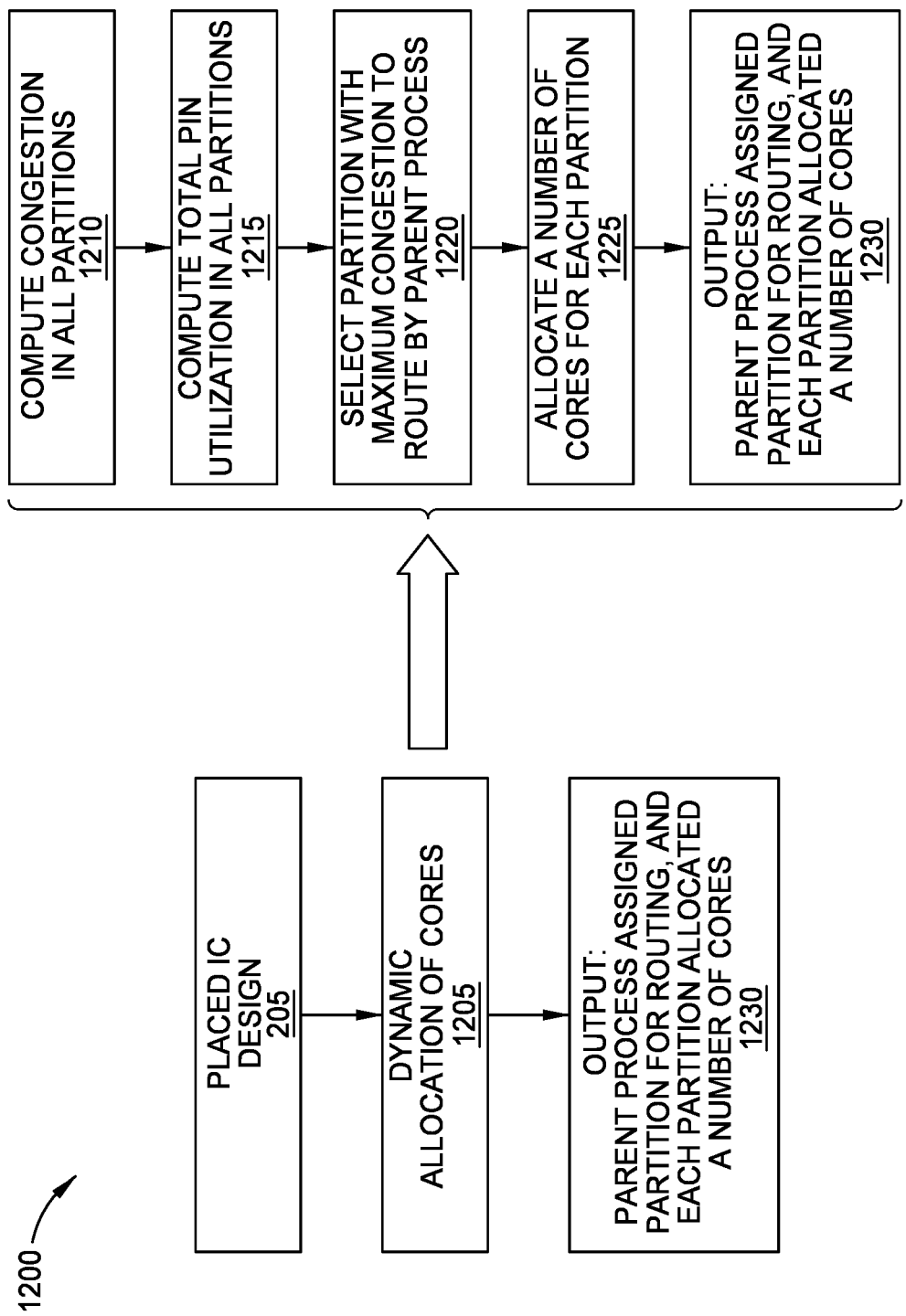
FIG. 12 is a flowchart of an example dynamic core allocation operation, according to some examples.

FIG. 12 is a flowchart 1200 of dynamically allocating compute cores in an IC design to address routing congestion and routing complexity, according to some examples. In some examples, the parent process 103 can use the maximum number of compute cores that can be used as an input, and can dynamically allocate cores of the IC design. Because routing for the IC design is partitioned (e.g., into programmable logic regions), the parent process 103 can address the allocation of compute cores to each partition to get maximum runtime scaling. Equal distribution of cores to partitions may not produce the best results since the complexity of routing for each partition may vary. In some examples, the parent process 103 can assign more cores to partitions with more complex routing to extract maximum benefit of overall compute resources allocated to the child processes 104.

According to some examples, after the parent process 103 performs placement 205 of components of the IC device, the parent process 103 can dynamically allocate the cores (at block 1205) before the parent process 103 instructs the child processes 104 to perform routing.

As illustrated in FIG. 12, dynamic allocation 1205 by the parent process 103 involves the parent process 103 computing congestion in all partitions. In some examples, the parent process 103 estimates the routing congestion based on placement of components of the IC device 120. The parent process 103 can use any method, technique, or implementation to estimate routing congestion based on placement.

At block 1215, the parent process 103 computes the utilization of all partition in terms of the total number of pins that should be routed. In some examples, the parent process 103 can compute the utilization of each partition in terms of the total number of pins that should be routed. The parent process can use any method, technique, or implementation to compute the total pin utilization for the partitions of the IC device 120. In some examples, a combination of congestion and pin count can accurately represent the complexity of a partition, and can be a proxy for the overall runtime of the partition.

At block 1220, once the parent process 103 completes estimating the routing congestion of each partition and the total pin utilization in the partitions of IC device 120, the parent process 103 determines the partition with the most complex routing so that the parent process can route this particular partition. In such examples, the child processes 104 have a small overhead for loading the design checkpoint before the child processes 104 can start routing. To prevent the overhead for the partition with the most complex routing, the parent process 103 can perform the routing for this partition.

At block 1225, the parent process 103 uses a normalized pin utilization to determine the assignment of cores to each partition, so that the total number of compute cores allocated matches pre-defined constraints. For example, the parent process 103 can use the following equation to determine the allocation of cores:

$$\text{Number of Cores} = \frac{\text{Pin Utilization of Partition} * \text{Maximum Number of Cores}}{\text{Total Pin Utilization}}$$

Other factors to determine the assignment of cores to the partitions include design utilization, the measure of routing congestion, and design complexity metrics (e.g., rent factor).

At block 1230, the dynamic allocation 1205 of cores results in each partition being allocated a number of cores of the IC device 120. In some examples, the dynamic allocation 1205 also includes the parent process 103 being assigned a partition of the IC device 120 to route.

Figure 13:
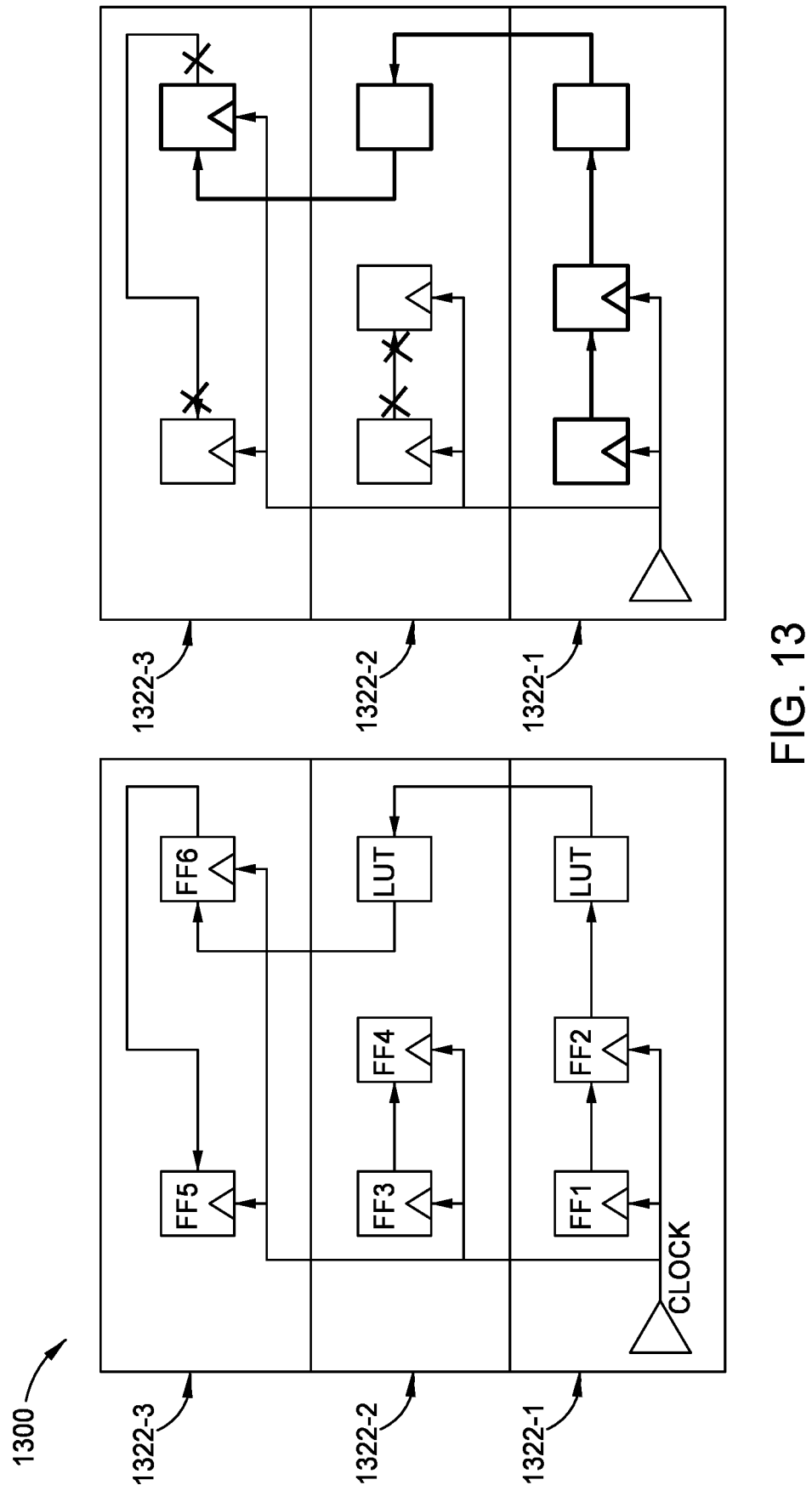
FIG. 13 illustrates timing path disabling for process routing, according to some examples.

FIG. 13 illustrates an example of partition-level timing path disabling, according to some examples. In some examples, the parent process 103 needs to process large designs, such as those used for emulating and/or prototyping application specific IC (ASIC) designs, and these IC designs often require a large timing graph with complex timing constraints. Accordingly, timing analysis and budgeting of these large graphs takes a long time. In multi-processing flows, because a child process 104 focuses on a single partition, the child process 104 does not analyze or consider timing paths completely contained in other partitions and thus disables those completely contained timing paths in other partitions. Disabling these timing paths reduces the amount of processing performed during the clock routing and can lead to savings on large designs and/or designs with complex timing constraints.

In some examples, when a child process 104 routes a net and the net happens to cross a partition boundary, then to get accurate timing, the child process 104 preserves the timing edges in the fan-out cone of the net until the child process 104 reaches a first level of sequential endpoints even though the sequential endpoints are not in the partition assigned to the child process 104. The child process 104 do not consider all other sequential endpoints in the partitions that the child process 104 is not routing from a timing perspective. For example, as illustrated in FIG. 13, when a child process 104 is routing partition 1322-1, the child process preserves all timing edges in partition 1322-1 and timing edges of any paths that cross over from partition 1322-1 to partition 1322-2 or from partition 1322-2 to partition 1322-3 up the first level of registers. All other timing paths in partition 1322-2 and partition 1322-3 are disabled for the child process 104 that is routing partition 1322-1. The child process 104 disables timing paths in partition 1322-2 and partition 1322-3 by simply disabling the timing vertices corresponding to the start/endpoints of the paths in partition 1322-2 and partition 1322-3. In such examples, the child process 104 does not need to traverse the entire logic cone to disable all the timing edges in partition 1322-2 and partition 1322-3. In some examples, the child process 104 can disconnect the starting points and endpoints to prevent all propagations.

Figure 14:
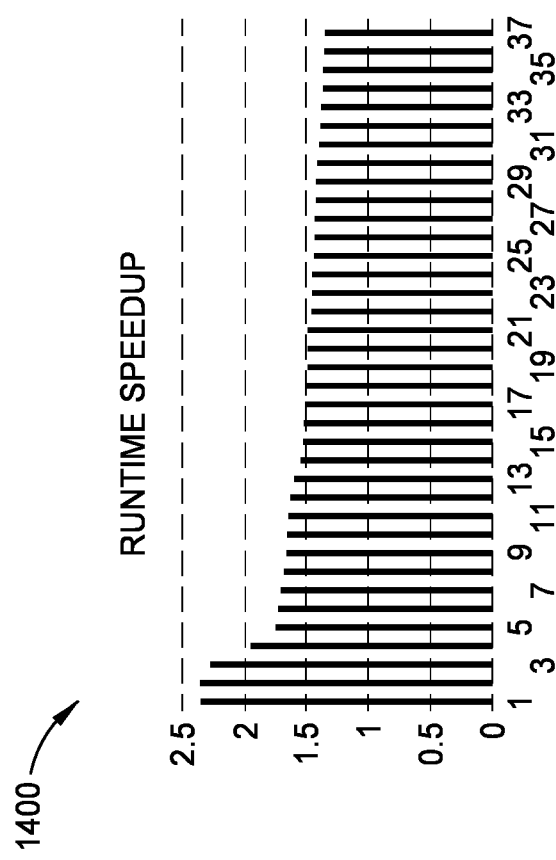
FIG. 14 is a graph of speedup on example various designs, according to some examples.

FIG. 14 is a graph 1400 illustrating runtime speedup with multi-processing flows, according to some examples. Generally, the multi-processing flows improve compile time by 1.62 times when running on four machines with four cores each (i.e., 16 total cores). Actual speedup depends on whether all the partitions are balanced in terms of their complexity. In some cases, the multi-processing flows improve compile time by 2.5×.

Figure 15:
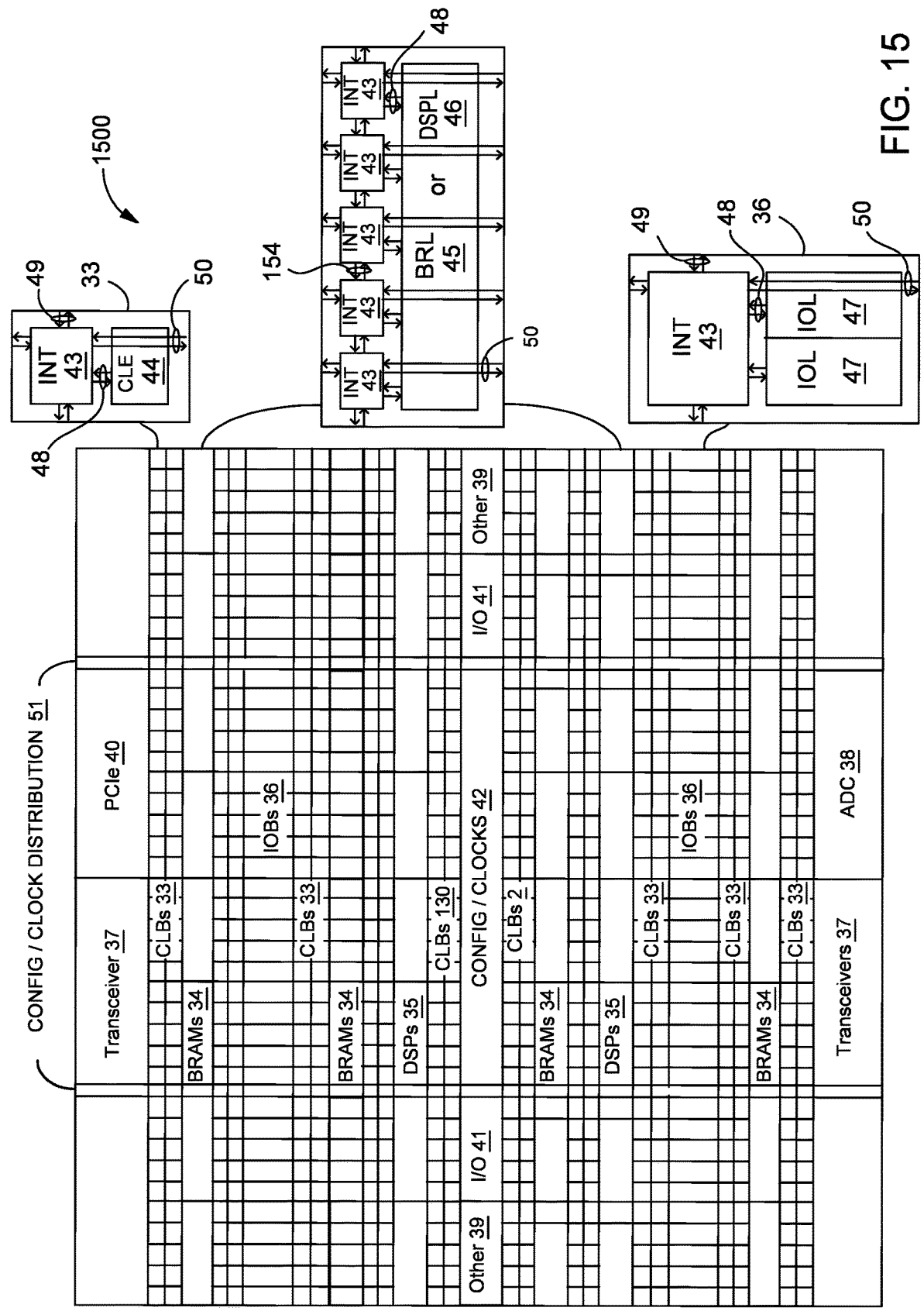
FIG. 15 illustrates a field programmable gate array (FPGA) that can be used with a parallel processing flow, according to some examples.

FIG. 15 illustrates an example of an FPGA 1500. The FPGA 1500 can be used as the IC device 120. The FPGA 1500 includes a programmable fabric that includes a large number of different programmable tiles including multi-gigabit transceivers ("MGTs") 37, configurable logic blocks ("CLBs") 2, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. Some FPGAs also include dedicated processor blocks ("PROC").

In some FPGAs, each programmable tile can include at least one programmable interconnect element ("INT") 43 having connections to input and output terminals 48 of a programmable logic element within the same tile. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA. Each programmable interconnect element 43 can include an interconnect circuit that can implement various types of switching among input interconnect segments and output interconnect segments, such as cross-point switching, breakpoint switching, multiplexed switching, and the like.

In an example, a CLB 2 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 166 in addition to one instance of the programmable interconnect element 43. As will be clear to those of skill in the art, the actual I/O pads connected, for example, to the I/O logic element 166 typically are not confined to the area of the input/output logic element 166.

In the pictured example, a horizontal area near the center of the die is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 15 include additional logic blocks that disrupt the regular columnar structure making up a large part of the FPGA. The additional logic blocks can be programmable blocks and/or dedicated logic. For example, processor block spans several columns of CLBs and BRAMs. The processor block can comprise various components ranging from a single microprocessor to a complete programmable processing system of microprocessor(s), memory controllers, peripherals, and the like.

Note that FIG. 15 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 15 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 15 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

The various examples described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples may be implemented as useful machine operations. In addition, one or more examples also relate to a device or an apparatus for performing these operations. The apparatus may be specially constructed for specific purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system. A computer readable media may be based on any existing or subsequently developed technology for embodying computer programs in a manner that enables them to be read by a computer. Examples of a computer readable medium (e.g., a non-transitory storage medium) include a hard drive, a Solid State Disk (SSD), network attached storage (NAS), read-only memory, random-access memory (e.g., a flash memory device), a CD (Compact Discs) CD-ROM, a CD-R or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

While the foregoing is directed to specific examples, other and further examples may be devised without departing from the basic scope thereof, and the scope thereof is determined by the claims that follow

What is claimed:

1. A non-transitory computer-readable medium storing instructions, which when executed on one or more processors, cause the one or more processors to perform operations, the operations comprising:
generating a plurality of child processes according to a number of a plurality of partitions in an integrated circuit (IC) design for an IC die and clock signal routing information, each of the plurality of child processes corresponding to and assigned to a respective one of the plurality of partitions;
transmitting each of the plurality of partitions and the clock signal routing information to a respective one of the plurality of child processes for routing based on the clock signal routing information, wherein each of the plurality of partitions comprises a placement of components for the IC design;
receiving a plurality of routings from the plurality of child processes; and
merging the plurality of routings into a global routing for the IC design.

2. The non-transitory computer-readable medium of claim 1, wherein each of the plurality of child processes is executed on a different processor of the one or more processors.

3. The non-transitory computer-readable medium of claim 1, wherein the plurality of child processes is executed on a same processor of the one or more processors.

4. The non-transitory computer-readable medium of claim 1, wherein the child processes share a memory and data stored in the memory.

5. The non-transitory computer-readable medium of claim 1, wherein a partition includes locations of nets between partitions.

6. The non-transitory computer-readable medium of claim 1, wherein the operations further comprise:
determining routing constraints for the plurality of partitions, wherein determining the routing constraints comprises performing critical net routing; and
transmitting the routing constraints to the plurality of child processes, wherein the routing is further based on the routing constraints.

7. The non-transitory computer-readable medium of claim 1, wherein the operations further comprise generating a design checkpoint for routing.

8. The non-transitory computer-readable medium of claim 1, wherein the operations further comprise dynamically allocating a number of compute cores for each partition to adjust runtime scaling.

9. The non-transitory computer-readable medium of claim 1, wherein each of the one or more processors is configured to access a common network mounted data storage.

10. The non-transitory computer-readable medium of claim 1, wherein the child processes operate in parallel.

11. The non-transitory computer-readable medium of claim 10, wherein the plurality of child processes execute operations for the routing asynchronously.

12. A non-transitory computer-readable medium storing instructions, which when executed on one or more processors, cause the one or more processors to perform operations, the operations comprising:
receiving, from a parent process, a partition for routing, wherein the partition is one of a plurality of partitions of an integrated circuit (IC) design for an IC die;
receiving, from the parent process, clock routing information and routing constraints determined by the parent process;
performing routing of a net to a plurality of loads on the partition based on the clock routing information and the routing constraints; and
transmitting results of the routing to the parent process to be merged into a global routing for the IC design.

13. The non-transitory computer-readable medium of claim 12, wherein the operations further comprise disabling timing paths in the partition when performing the routing.

14. The non-transitory computer-readable medium of claim 12, wherein the operations further comprise performing timing updates and budgeting for the routing.

15. The non-transitory computer-readable medium of claim 14, wherein a delay for segments in other partitions equals an assigned budget.

16. The non-transitory computer-readable medium of claim 14, wherein budgeting comprises determining a segment budget based on a segment delay, a budget of a constrained downhill pin, and a delay of a path through a segment.

17. The non-transitory computer-readable medium of claim 16, wherein the delay of a path through the segment is based on a delay of a longest path to the segment and a delay of a longest path from the segment.

18. The non-transitory computer-readable medium of claim 16, wherein the operations further comprise applying segment delay weights for the segment budget.

19. A method, comprising:
generating a plurality of child processes according to a number of a plurality of partitions in an integrated circuit (IC) design for an IC die and clock signal routing information, each of the plurality of child processes corresponding to and assigned to a respective one of the plurality of partitions;
transmitting each of the plurality of partitions and the clock signal routing information to a respective one of the plurality of child processes for routing based on the clock signal routing information, wherein each of the plurality of partitions comprises a placement of components for the IC design;
receiving a plurality of routings from the plurality of child processes; and
merging the plurality of routings into a global routing for the IC design.

20. The non-transitory computer-readable medium of claim 1, wherein generating clock signal routing information comprises performing local clock routing for the plurality of partitions.

* * * * *